United States Patent
Bell et al.

(10) Patent No.: US 11,578,238 B2
(45) Date of Patent: *Feb. 14, 2023

(54) METHOD FOR MITIGATING PASSIVE INTERMODULATION

(71) Applicant: JOHNS MANVILLE, Denver, CO (US)

(72) Inventors: Thomas Bell, Colorado Springs, CO (US); Christopher Griffin, Aurora, CO (US); Jacob Heaps, Edgewater, CO (US); Joel Hazy, Brighton, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,358

(22) Filed: Aug. 19, 2021

(65) Prior Publication Data
US 2021/0380847 A1 Dec. 9, 2021

Related U.S. Application Data

(63) Continuation of application No. 16/994,284, filed on Aug. 14, 2020, now Pat. No. 11,124,677, which is a (Continued)

(51) Int. Cl.
*B29C 48/154* (2019.01)
*B29C 48/00* (2019.01)
(Continued)

(52) U.S. Cl.
CPC ............ *C09J 7/22* (2018.01); *B29C 48/0011* (2019.02); *B29C 48/0021* (2019.02);
(Continued)

(58) Field of Classification Search
CPC ...... H04B 15/00; H04B 15/02; H04B 17/104; H04B 17/34; H01Q 15/14; H01Q 17/00;
(Continued)

(56) References Cited

U.S. PATENT DOCUMENTS 3,900,644 A 4/1975 Sackoff et al.
4,386,354 A 5/1983 Watson
(Continued)

FOREIGN PATENT DOCUMENTS

CN 1571623 A 1/2005
CN 102468529 A 5/2012
(Continued)

OTHER PUBLICATIONS

Anritsu Company, Identifying Sources of External PIM, pp. 1-10.
(Continued)

*Primary Examiner* — David Bilodeau
(74) *Attorney, Agent, or Firm* — Robert D. Touslee

(57) ABSTRACT

Materials and methods for mitigating passive intermodulation. A membrane for reducing passive intermodulation includes a first polymeric layer, a second polymeric layer, and a continuous metal layer encapsulated between the first and second polymeric layers. A self-adhesive radio frequency barrier tape includes a waterproof polymeric top layer, a metal-containing layer adhered by an adhesive layer to the polymeric top layer, a pressure sensitive adhesive layer adhered to the metal-containing layer, and a release liner on a bottom surface of the pressure sensitive adhesive layer. A method of mitigating passive intermodulation includes passing a probe over an area of interest, the probe being sensitive to an intermodulation frequency of interest, and identifying a suspected source of passive intermodulation when the amplitude of the probe output exceeds a threshold at the frequency of interest. The method further includes covering the suspected passive intermodulation source with a radio frequency barrier material.

20 Claims, 11 Drawing Sheets

Related U.S. Application Data continuation of application No. 15/786,785, filed on Oct. 18, 2017, now Pat. No. 10,778,343.

(60) Provisional application No. 62/426,673, filed on Nov. 28, 2016.

(51) Int. Cl.

| | |
|---|---|
| B32B 15/085 | (2006.01) |
| C09J 7/22 | (2018.01) |
| C09J 7/20 | (2018.01) |
| C09J 7/29 | (2018.01) |
| C09J 7/38 | (2018.01) |
| H04B 17/10 | (2015.01) |
| B32B 27/30 | (2006.01) |
| B32B 27/32 | (2006.01) |
| G21F 1/12 | (2006.01) |
| H01Q 1/24 | (2006.01) |
| H01Q 3/26 | (2006.01) |
| H01Q 17/00 | (2006.01) |
| H04B 15/00 | (2006.01) |
| H04B 15/02 | (2006.01) |
| B32B 27/08 | (2006.01) |
| C09J 7/24 | (2018.01) |
| B32B 37/12 | (2006.01) |
| B32B 37/16 | (2006.01) |
| B32B 15/20 | (2006.01) |
| B32B 3/26 | (2006.01) |
| B32B 7/06 | (2019.01) |
| B32B 7/12 | (2006.01) |
| B32B 11/08 | (2006.01) |
| B32B 15/08 | (2006.01) |
| H04B 17/345 | (2015.01) |
| B32B 11/00 | (2006.01) |
| C09J 195/00 | (2006.01) |
| H01Q 15/14 | (2006.01) |
| B32B 11/04 | (2006.01) |
| B32B 37/24 | (2006.01) |

(52) U.S. Cl.
CPC ............ *B29C 48/154* (2019.02); *B32B 3/266* (2013.01); *B32B 7/06* (2013.01); *B32B 7/12* (2013.01); *B32B 11/08* (2013.01); *B32B 15/08* (2013.01); *B32B 15/085* (2013.01); *B32B 15/20* (2013.01); *B32B 27/08* (2013.01); *B32B 27/304* (2013.01); *B32B 27/32* (2013.01); *B32B 37/12* (2013.01); *B32B 37/16* (2013.01); *C09J 7/20* (2018.01); *C09J 7/243* (2018.01); *C09J 7/245* (2018.01); *C09J 7/29* (2018.01); *C09J 7/38* (2018.01); *G21F 1/125* (2013.01); *H01Q 1/246* (2013.01); *H01Q 3/267* (2013.01); *H01Q 17/00* (2013.01); *H04B 15/00* (2013.01); *H04B 15/02* (2013.01); *H04B 17/104* (2015.01); *B29C 48/022* (2019.02); *B32B 11/00* (2013.01); *B32B 11/046* (2013.01); *B32B 2037/246* (2013.01); *B32B 2250/05* (2013.01); *B32B 2250/40* (2013.01); *B32B 2307/212* (2013.01); *B32B 2311/24* (2013.01); *B32B 2323/16* (2013.01); *B32B 2327/06* (2013.01); *B32B 2395/00* (2013.01); *C09J 195/00* (2013.01); *C09J 2301/302* (2020.08); *C09J 2301/40* (2020.08); *C09J 2400/163* (2013.01); *C09J 2423/166* (2013.01); *C09J 2427/006* (2013.01); *C09J 2495/00* (2013.01); *C09J 2495/006* (2013.01); *H01Q 15/14* (2013.01); *H04B 17/345* (2015.01)

(58) Field of Classification Search
CPC ........ H01Q 1/246; H01Q 3/267; G21F 1/125; C09J 195/00; C09J 2301/302; C09J 2301/40; C09J 2400/163; C09J 2423/166; C09J 2427/006; C09J 2495/00; C09J 2495/006; C09J 7/20; C09J 7/22; C09J 7/29; C09J 7/38; B32B 11/00; B32B 11/04; B32B 11/042; B32B 11/046; B32B 11/06; B32B 11/08; B32B 11/10; B32B 15/08; B32B 15/082; B32B 15/085; B32B 15/14; B32B 15/20; B32B 21/08; B32B 2250/05; B32B 2250/40; B32B 2255/10; B32B 2255/12; B32B 2255/205; B32B 2262/0215; B32B 2262/0276; B32B 2262/101; B32B 2307/20; B32B 2307/206; B32B 2307/212; B32B 2307/402; B32B 2307/732; B32B 2307/748; B32B 2311/24; B32B 2323/16; B32B 2327/06; B32B 2395/00; B32B 2419/06; B32B 27/065; B32B 27/08; B32B 27/10; B32B 27/12; B32B 27/18; B32B 27/304; B32B 27/32; B32B 27/36; B32B 3/266; B32B 5/028; B32B 5/18; B32B 7/02; B32B 7/04; B32B 7/06; B32B 7/08; B32B 7/12; B32B 9/045; B29C 48/0011; B29C 48/0021; B29C 48/022; B29C 48/154

See application file for complete search history.

(56) References Cited

U.S. PATENT DOCUMENTS

| | | |
|---|---|---|
| 4,585,682 A | 4/1986 | Colarusso et al. |
| 4,640,851 A | 2/1987 | Pusch |
| 4,755,409 A | 7/1988 | Harkness |
| 5,025,207 A | 6/1991 | Gauthier |
| 5,456,779 A | 10/1995 | Sinha |
| 5,458,162 A | 10/1995 | Sinha |
| 5,493,771 A | 2/1996 | Sinha et al. |
| 5,494,755 A | 2/1996 | McCloskey |
| 5,517,206 A | 5/1996 | Boone et al. |
| 5,598,989 A | 2/1997 | Ross et al. |
| 5,757,246 A | 5/1998 | Johnson |
| 5,885,906 A | 3/1999 | Reynolds et al. |
| 5,886,294 A | 3/1999 | Scrimpshire et al. |
| 6,067,053 A | 5/2000 | Runyon et al. |
| 6,222,503 B1 | 4/2001 | Gietema et al. |
| 6,479,119 B1 | 11/2002 | Simpson |
| 7,227,508 B2 | 6/2007 | Wang et al. |
| 7,391,381 B2 | 6/2008 | Wang et al. |
| 7,429,961 B2 | 9/2008 | Sievenpiper et al. |
| 7,639,207 B2 | 12/2009 | Sievenpiper et al. |
| 8,253,644 B2 | 8/2012 | Hnatiw |
| 8,507,086 B2 | 8/2013 | Padiyath et al. |
| 9,112,283 B2 | 8/2015 | Shoemaker |
| 9,653,852 B2 | 5/2017 | Smentek et al. |
| 10,033,175 B1 | 7/2018 | Schumacher |
| 10,778,343 B2 * | 9/2020 | Bell ............... B32B 27/065 |
| 11,124,677 B2 * | 9/2021 | Bell ............... B32B 5/18 |
| 2003/0054127 A1 | 3/2003 | Heifetz |
| 2005/0216075 A1 | 9/2005 | Wang et al. |
| 2008/0223186 A1 | 9/2008 | Leichliter et al. |
| 2009/0023403 A1 | 1/2009 | LaBerge |
| 2009/0318087 A1 | 12/2009 | Mattila et al. |
| 2010/0139178 A1 | 6/2010 | Ehrman |
| 2011/0050530 A1 | 3/2011 | Hnatiw |
| 2013/0063393 A1 | 3/2013 | Kunshma |
| 2013/0310023 A1 | 11/2013 | Bevan et al. |
| 2014/0119197 A1 | 5/2014 | Maca et al. |
| 2014/0272244 A1 | 9/2014 | Harrington, Jr. et al. |
| 2014/0292609 A1 | 10/2014 | Schadler |
| 2015/0042536 A1 | 2/2015 | Emerick et al. |

(56) References Cited

U.S. PATENT DOCUMENTS

| | | | |
|---|---|---|---|
| 2015/0171902 A1 | 6/2015 | Fleischer et al. | |
| 2016/0307606 A1 | 10/2016 | McGuire, Jr. et al. | |
| 2017/0279202 A1 | 9/2017 | Galla et al. | |
| 2017/0373386 A1* | 12/2017 | Larson | B32B 27/322 |
| 2018/0058071 A1 | 3/2018 | Grube et al. | |
| 2018/0248576 A1 | 8/2018 | Coe et al. | |

FOREIGN PATENT DOCUMENTS

| | | |
|---|---|---|
| CN | 203406418 U | 1/2014 |
| DE | 20 2004 012 762 U1 | 1/2005 |
| EP | 2 573 865 A1 | 3/2013 |
| EP | 3 032 642 A1 | 6/2016 |
| GB | 2065156 A | 6/1981 |
| JP | 2002076740 A | 3/2002 |
| JP | 2008028549 A | 2/2008 |
| JP | 2012129772 A | 7/2012 |
| WO | 2006096696 A2 | 9/2006 |

OTHER PUBLICATIONS

Anritsu Company, Test Probe for More Efficient and Effective Location of External PIM Sources, Nov. 22, 2016, pp. 1-2.
Johns Manville Sales Gmbh, Evalith® Glasfaservlies / glass fiber nonwoven, May 17, 2017, p. 1.
Isola a.s., Laying instructions—High quality single layer Roofing System, pp. 1-12.
Isola a.s., Isola Mestertekk Robust roof covering suitable for our tough Nordic climate, Sep. 29, 2017, pp. 1-2.
Isola a.s., Isola Mestertekk Single layer roofing felt for flat and pitched roofs, Sep. 3, 2013, pp. 1-3.
Anritsu Anerica, Passive Intermodulation (PIM), Oct. 20, 2017, pp. 1-13.
Anritsu, The PIM Source, Sep. 29, 2017, pp. 1-5.
Johns Manville, Dynaclad® Fiber Glass-Reinforced, SBS Aluminum Foil-Surfaced, Cap or Flashing Sheet, Mar. 2016, pp. 1-2.
William D. Wade, Development of Low PIM, Zero CTE Mesh for Deployable Communications Antennas, Lockheed Missiles and Space Company, pp. 1175-1178.

* cited by examiner

METHOD FOR MITIGATING PASSIVE INTERMODULATION

CROSS REFERENCE TO RELATED APPLICATIONS

This application is a continuation of U.S. patent application Ser. No. 16/994,284 filed Aug. 14, 2020, which is a continuation of U.S. patent application Ser. No. 15/786,785, filed Oct. 18, 2017 and titled "Method for Mitigating Passive Intermodulation", now U.S. Pat. No. 10,778,343 issued Sep. 15, 2020, and this application claims the benefit of provisional U.S. Patent Application No. 62/426,673, filed Nov. 28, 2016 and titled "PIM Reducing RF Barrier", the entire disclosures of which are hereby incorporated by reference herein for all purposes.

BACKGROUND

An essential element of modern mobile communications systems is the "cell site." The cell site includes one or more directional base station antennas aimed at a desired geographical area of coverage with coaxial cable connecting the antennas to base station radio equipment. The base station radio equipment acts as a transceiver, transmitting high power signals (37 dBm to 49 dBm channel power) in the direction of mobile users and receives low power signals (as low as −106 dBm channel power) from mobile user equipment. Often the range of a cell site is uplink limited, meaning that the distance that a particular cell site is able to cover is limited by the transmit power of the mobile equipment and the path loss between the mobile equipment and the cell site. The signal received at the cell site from mobile equipment reduces by 6 dB each time the distance between the mobile equipment and the cell site is doubled. Eventually, the signal from the mobile equipment drops to a level where the base station receiver is not able to distinguish the signal from background noise, and the call is dropped.

Mobile operators typically design their network of cell sites to achieve a signal-to-interference plus noise ratio (SINR) of >6 dB across the region of coverage. This means that the signal level arriving from mobile equipment at each base station receiver should be at least 6 dB higher than all sources of noise generated within or received by the base station receiver. For data networks, the network of cell sites may be designed to achieve even higher SINR levels to enable faster data transmission.

In order to achieve the strongest possible signal from mobile equipment, it is desirable to locate the cell site antennas at an elevation that is higher than the average clutter (trees, buildings, etc.) in the area to be covered. This can be achieved by erecting a tower at the cell site to support the antennas at the desired elevation or can be achieved by mounting the antennas on existing infrastructure, such as building rooftops. When mounting antennas on buildings, the building owner may require for aesthetic reasons that the operator only install the antennas at locations that are not visible from the ground outside the building. This often forces the antennas to be installed near the center of the building rooftop rather than near the edges of the building.

For example, FIG. 1 shows a ground-level perspective view of a building 100, showing that no cell site is visible. However, FIG. 2 shows building 100 from an upper oblique view, revealing cell site 200 on roof 201, set back from the edges of roof 201.

The performance of cell sites installed on building rooftops is often limited due to passive intermodulation (PIM). Passive intermodulation occurs when the high-power downlink signals broadcast by the base station antennas mix at passive, non-linear junctions in the RF path, creating new signals. If these new signals (intermodulation products) fall in an operator's uplink band, they act as interference and reduce SINR. As the SINR is reduced, the geographic coverage of the cell site is reduced and the data capacity of that cell site is reduced.

BRIEF SUMMARY

According to one aspect, a method of mitigating passive intermodulation comprises injecting two signals of two known frequencies into an antenna system, such that the antenna system produces radio frequency radiation containing the two known frequencies directed toward an area to be tested for passive intermodulation. The method further comprises calculating an intermodulation frequency from the two known frequencies, and connecting a probe to a spectrum analyzer. The spectrum analyzer is configured to receive radio frequency signals produced at the intermodulation frequency. The method further comprises passing the probe over the area to be tested while simultaneously monitoring the signal received by the spectrum analyzer, and identifying a suspected source of passive intermodulation when the spectrum analyzer detects a signal amplitude above a threshold value at the intermodulation frequency. The method further comprises covering the suspected source of passive intermodulation with a temporary radio frequency barrier material configured to mitigate passive intermodulation, and re-measuring the signal amplitude at the suspected source of passive intermodulation at the intermodulation frequency with the radio frequency barrier material in place, to verify a reduction in passive intermodulation. The method further comprises replacing the temporary radio frequency barrier material with a permanent radio frequency barrier material. In some embodiments, the permanent radio frequency barrier material comprises a first polymeric layer, a second polymeric layer, and a metal layer encapsulated between the first and second polymeric layers. In some embodiments, the metal layer is continuous. In some embodiments, the metal layer is perforated. In some embodiments, the metal layer is deposited on a plastic sheet, and the metal layer and the plastic sheet are encapsulated between the first and second polymeric layers. In some embodiments, at least one of the first and second polymeric layers comprises thermoplastic polyolefin (TPO). In some embodiments, at least one of the first and second polymeric layers comprises ethylene propylene diene monomer (EPDM). In some embodiments, at least one of the first and second polymeric layers comprises polyvinyl chloride (PVC). In some embodiments, at least one of the first and second polymeric layers comprises modified bitumen. In some embodiments, the area to be tested for passive intermodulation is on a rooftop, and covering the suspected source of passive intermodulation with a permanent radio frequency barrier material comprises covering the suspected source of passive intermodulation with a walk pad. In some embodiments, the area to be tested for passive intermodulation is on a rooftop, and covering the suspected source of passive intermodulation with a permanent radio frequency barrier material comprises covering most or all of the area to be tested with a roofing membrane configured to be a radio frequency barrier. In some embodiments, covering the suspected source of passive intermodulation with a permanent radio frequency barrier material comprises covering the suspected source of passive intermodulation with a self-adhesive radio frequency barrier material.

DETAILED DESCRIPTION

Loosely touching metal-to-metal surfaces as well as rusty metal surfaces behave in a non-linear fashion and can generate PIM when illuminated with RF energy. On rooftop cell site installations where the antennas are placed near the center of the roof, many non-linear objects may be present in front of the antenna. PIM sources may be located within the cellular network equipment or externally. Common external sources include loosely contacting sheet metal flashing used for weatherproofing, loose connections at overlapping metal decking members, rusty bolts, vent pipes, and the like. Common internal sources may include loose mechanical junctions, oxidized or contaminated surfaces, connections or contact between dissimilar metals, and the like. Loose metal-to-metal contacts can also occur at the fastener locations, where due to time and thermal expansion, the heads of screws or nails are no longer applying high contact pressure. Since steel is a common material used in roof construction, rust is likely to form at locations where moisture has been able to penetrate the roof membrane.

Figure 1:
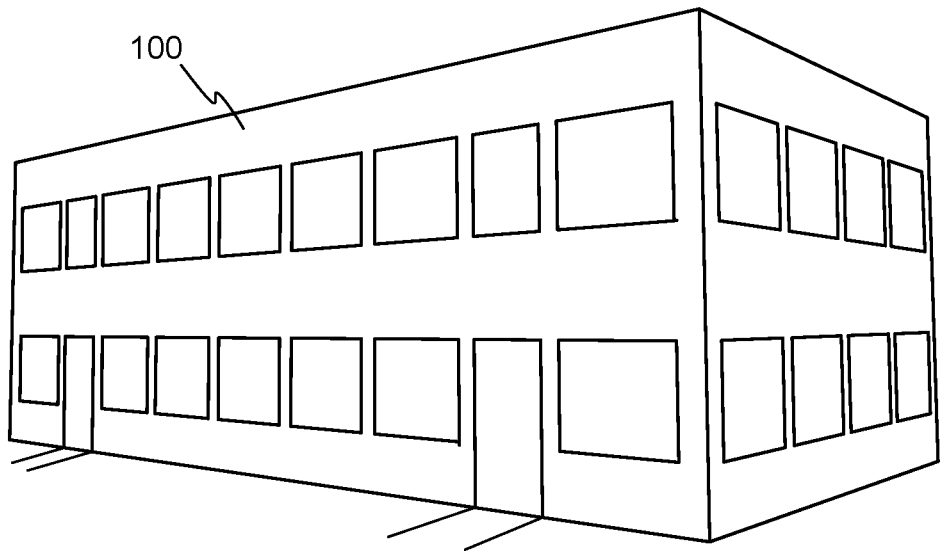
FIG. 1 shows a ground-level perspective view of a building.
Figure 2:
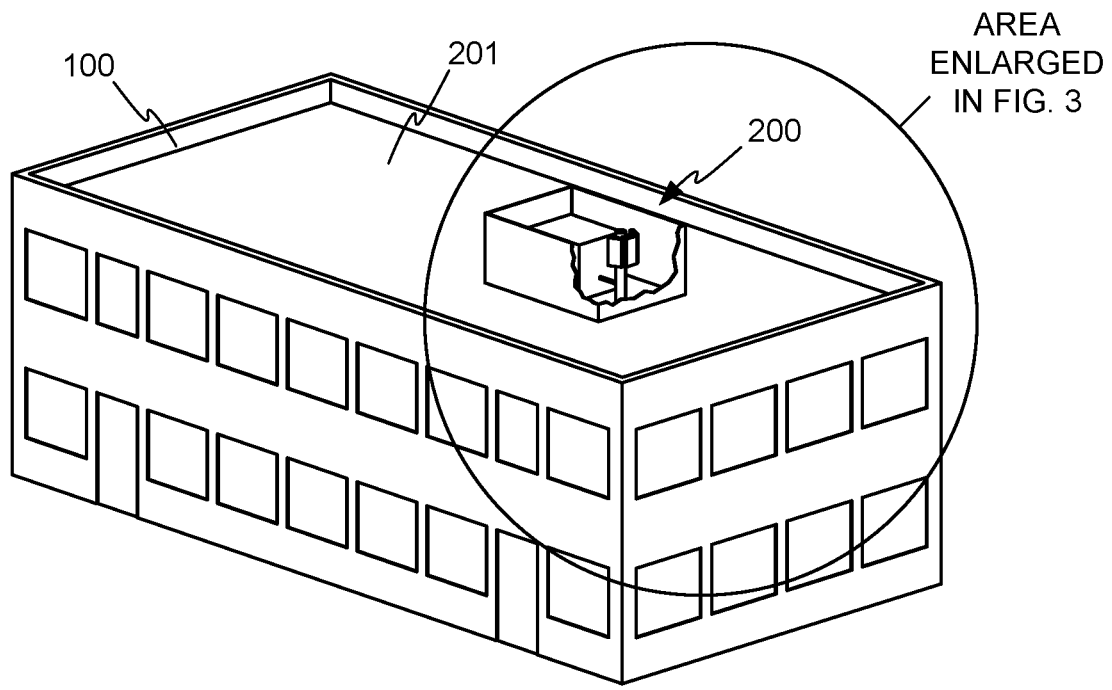
FIG. 2 shows the building of FIG. 1 from an upper oblique view, revealing a cell site on the roof of the building.
Figure 3:
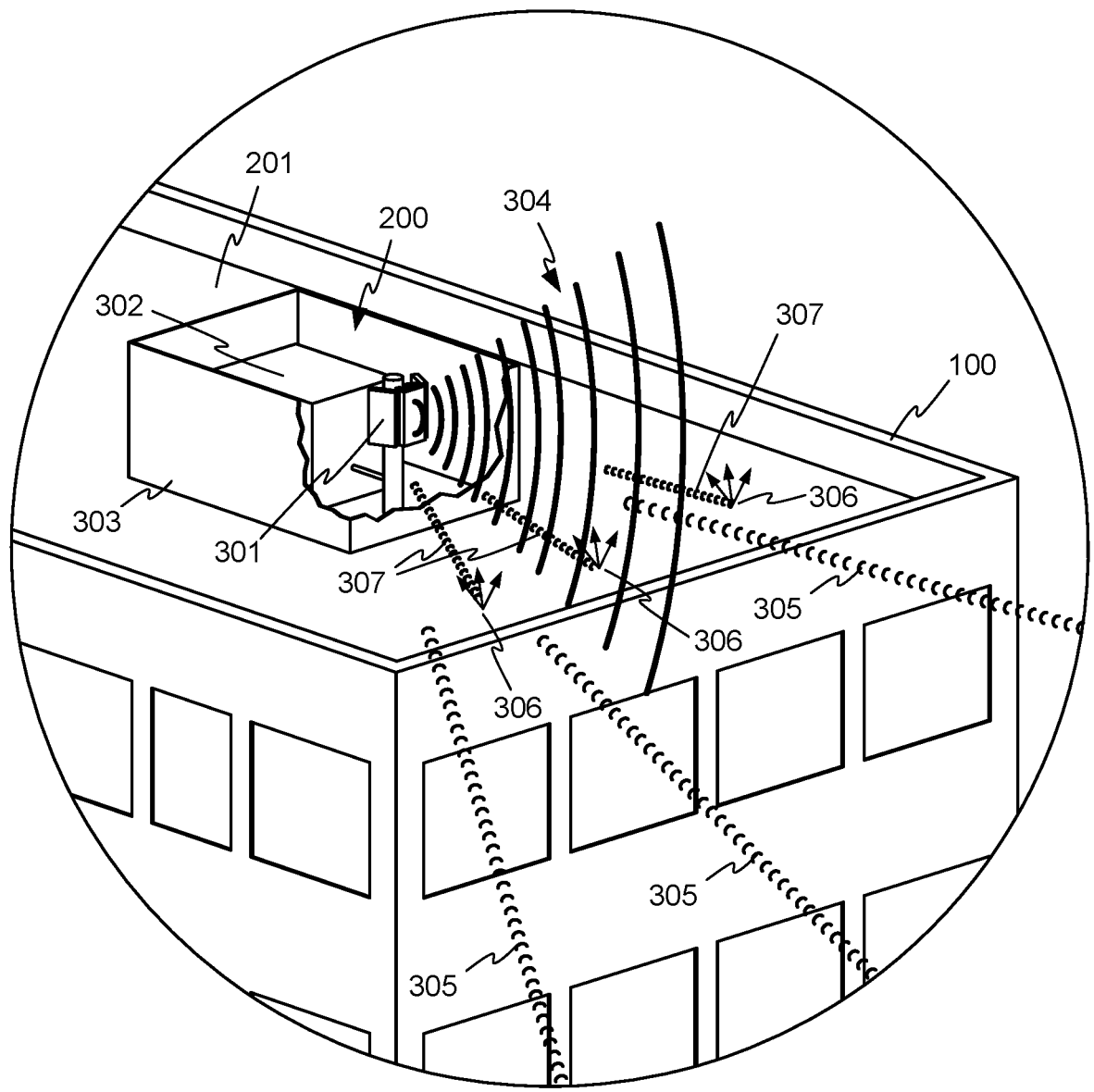
FIG. 3 illustrates the generation of passive intermodulation.

FIG. 3 shows an enlarged view of a portion of FIG. 2, and illustrates PIM in more detail. Cell site 200 includes one or more antennas 301, connected to control electronics 302. Cell site 200 may be surrounded by an RF-transparent screen 303 for aesthetic purposes. Antenna 301 transmits relatively high-power downlink signals 304, and receives relatively low-power uplink signals 305 from a number of cellular phones in the vicinity.

In FIG. 3, various PIM sources 306 are shown emitting RF noise 307 in response to exposure to downlink signals 304. Some of the RF noise is directed toward antenna 301, and some may fall within the uplink band, thus reducing the uplink SINR. Many PIM sources 306 may be encompassed in the relatively wide area of roof 201 exposed between cell site 200 and the edges of roof 201 and subject to downlink signals 304.

Rooftop PIM sources at cellular installations have been shown to produce 3rd order intermodulation products (IM3) as high as −50 dBm when the site is tested by injecting 43 dBm test tones into the cell site antenna. This level of PIM is almost 50 dB (100,000 times) higher than the typical "passing" PIM level required for acceptable site performance.

In accordance with embodiments of the invention, covering the non-linear objects on the rooftop with an RF barrier significantly reduces the PIM generated by these non-linear objects. For every 1 dB that the RF barrier is able to attenuate the signal arriving at a non-linear junction, the IM3 level seen at the base station receiver is typically reduced by 3.5 dB.

Figure 4:
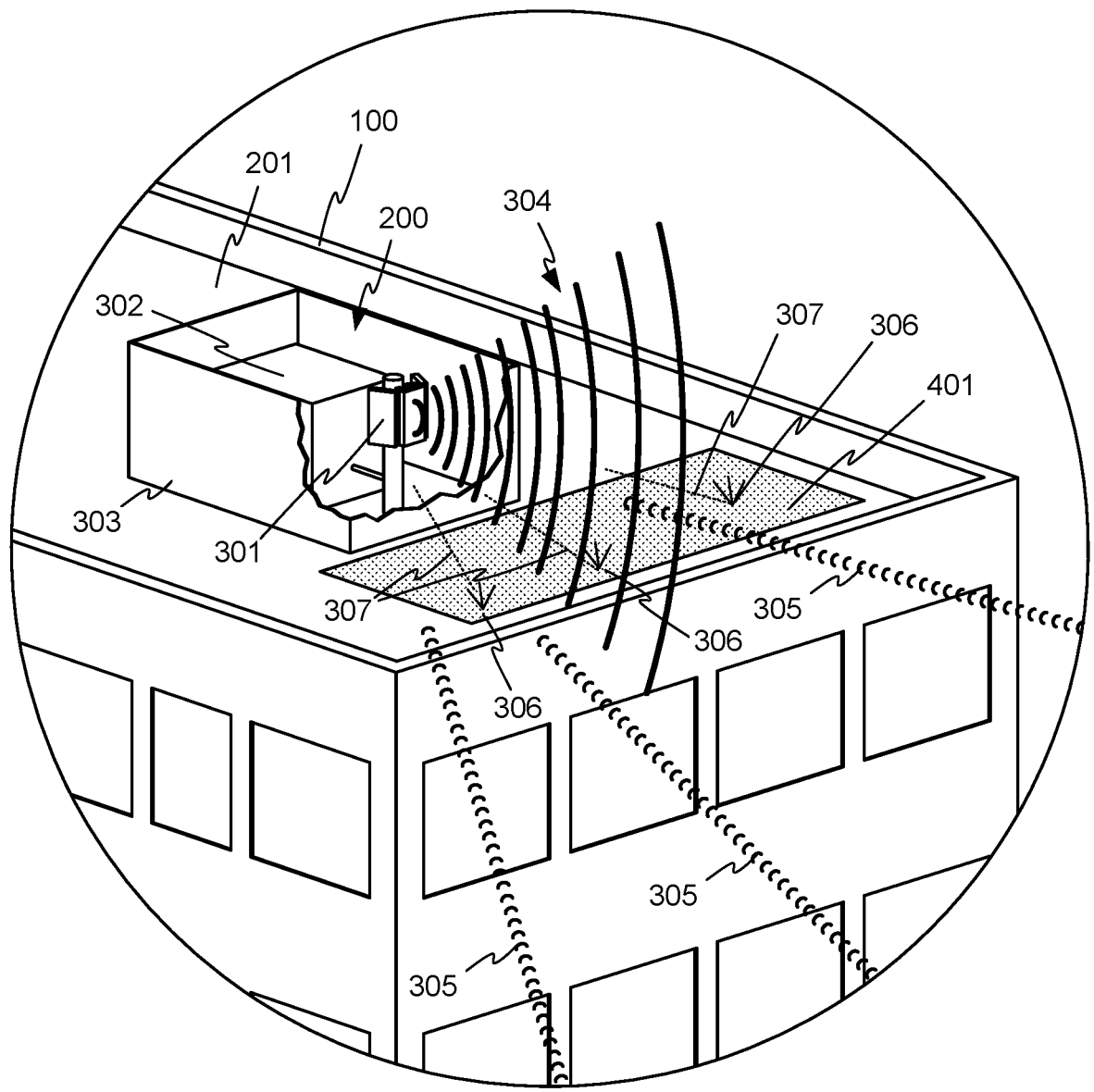
FIG. 4 illustrates the building of FIG. 1 with an RF barrier installed on the roof of the building, in accordance with embodiments of the invention.

FIG. 4 illustrates building 100 and cell site 200 with an RF barrier 401 installed on roof 201, over PIM sources 306. RF barrier 401 reduces the RF energy reaching PIM sources 306, and consequently reduces the amount of PIM generated at sources 306.

Figure 5:
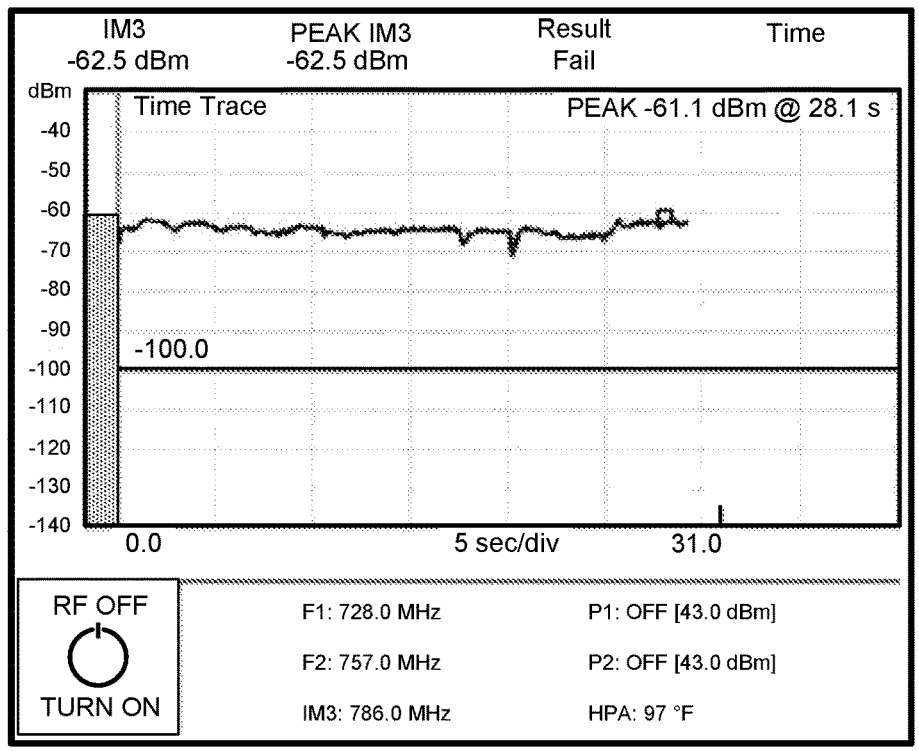
FIGS. 5 and 6 show measurements of a typical cell site installation, before and after placement of an RF barrier in accordance with embodiments of the invention.
Figure 6:
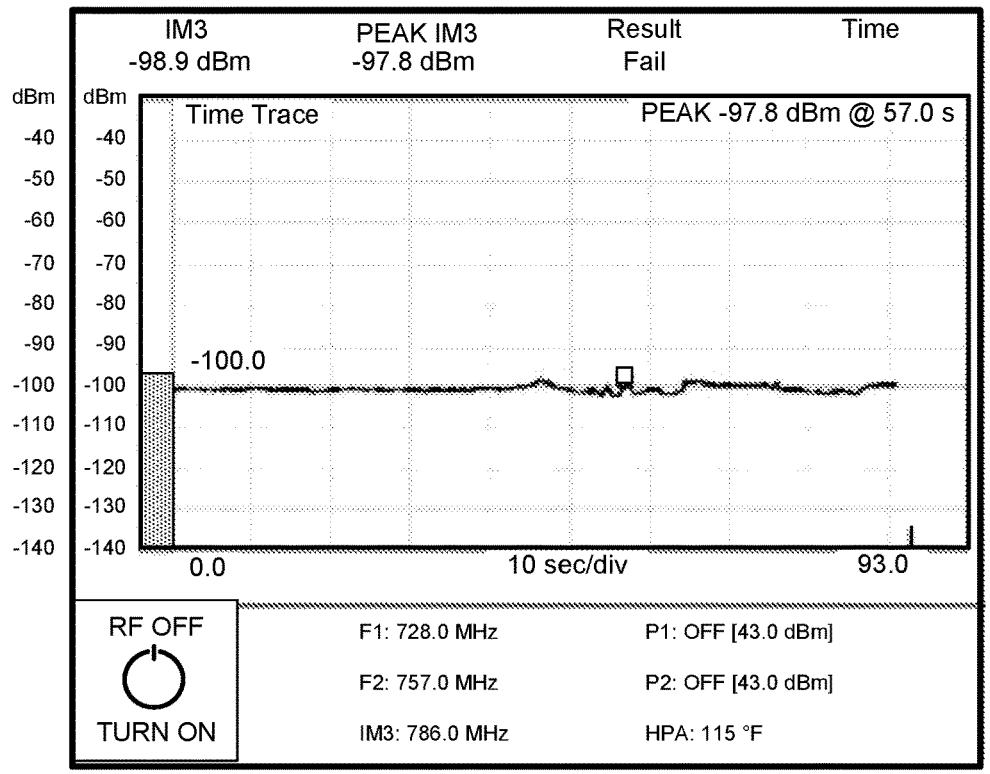

RF barrier 401 preferably reduces the RF energy reaching PIM sources 306 by at least 10 dB. This will reduce the magnitude of PIM generated by PIM sources under the barrier by approximately 35 dB. In other embodiments more or less attenuation may be provided. For example, FIGS. 5 and 6 show measurements of a typical cell site installation, before and after placement of an RF barrier such as RF barrier 401. In the example of FIGS. 5 and 6, a reduction in PIM magnitude of approximately 36 dB was achieved, from −61.1 dBm to −97.8 dBm.

The attenuation may be achieved through absorption, reflection or a combination of the two. For example, a reflective material such as RF barrier 401 reflects at least some of the original RF signals 304 from antenna 301, reducing the induced current in the underlying PIM sources, and ultimately reducing the magnitude of the PIM generated.

Preferably, the materials used to construct RF barrier 401 do not themselves become a PIM source. For example, RF barrier 401 should not contain loose metal-to-metal contacts, and should be installable in a way that prevents loose metal-to-metal contacts from being formed. Preferably, RF barrier 401 can be cut in the field to custom shapes without generating burrs that could touch other metal surfaces and generate PIM.

In cases where the RF barrier is applied to existing rooftop surfaces, it is desirable that RF barrier 401 and any mounting system for RF barrier 401 not penetrate the existing roof membrane, so that any warranty of the existing roof is not voided. In addition, penetrations are preferably avoided because they are typically made with metal fasteners, which could become PIM sources themselves.

Preferably, the materials of RF barrier 401 provide good environmental stability and durability, similar to typical roofing materials. For example, RF barrier 401 may provide up to 10 years or more of operating life when installed in a rooftop environment. This includes exposure to ultraviolet radiation, wind, rain, snow, extreme heat and extreme cold. The material of RF barrier 401 preferably will not rot, support fungal growth or delaminate after long term environmental exposure. In addition, an RF barrier 401 applied in an area subject to foot traffic should be able to withstand people walking on the barrier without physical damage or deterioration in performance.

Figure 7:
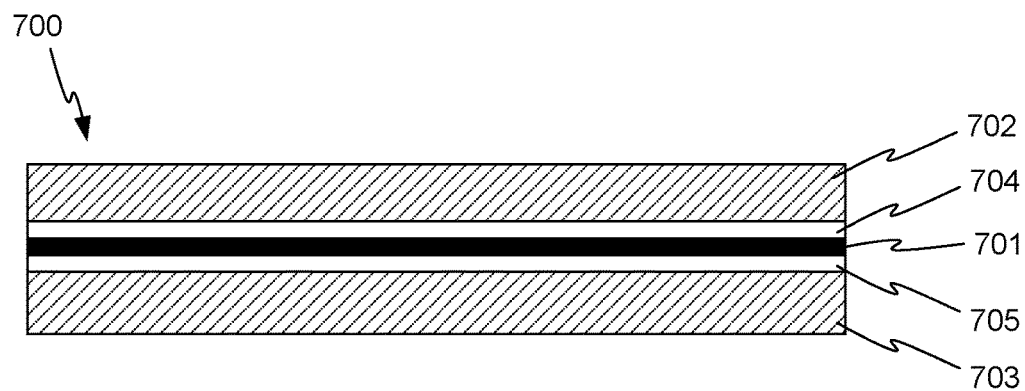
FIG. 7 illustrates a PIM barrier membrane, in accordance with embodiments of the invention.

FIG. 7 illustrates a PIM barrier membrane 700, in accordance with embodiments of the invention. Example membrane 700 includes a metal layer 701 sandwiched between two polymeric layers 702 and 703. Metal layer 701 may include, for example, a layer of aluminum having a thickness of 10 to 100 nanometers. Other metals may be used, for example copper, and other thicknesses of metal may be used if desired. For example, in other embodiments, the thickness of the metal layer may be up to 40 microns or more. The metal of metal layer 701 may be vapor deposited or otherwise coated on a film 704 such as a 0.0005 to 0.025 inch thick polyester film or other plastic film for ease of handling. In some embodiments, the metal layer 701 may be enclosed between two similar plastic films 704 and 705. In some embodiments, metal layer 701 may be a metal foil, which in turn may be bonded to a reinforcement mat made of polyester, glass, or another suitable material.

Metal layer 701 may be continuous, and formed without folds or other features that may cause metal-to-metal contact. In other embodiments, the metal layer may be perforated, having very small holes to improve adhesion of the polymeric layers. Any holes should preferably have a size of no more than 1/50th of the wavelength of the lowest operating frequency of the cell site.

Polymeric layers 702 and 703 may be made of thermoplastic polyolefin (TPO), ethylene propylene diene monomer (EPDM), polyvinyl chloride (PVC), modified bitumen, or another suitable polymer with sufficient durability for use on a roof. Polymeric layers 702 and 703 may each have a thickness of between 0.010 and 0.100 inches, or another suitable thickness. Membrane 700 may have an overall thickness of between 0.020 and 0.250 inches, or another suitable thickness. In some embodiments, membrane 700 may have an overall thickness of between 0.040 and 0.150 inches, and may preferably have a thickness between 0.050 and 0.100 inches. Polymeric layers 702 and 703 may be made of the same material or of different materials. For example, polymeric layer 702 could be made of TPO and polymeric layer 703 of EPDM. Many combinations are possible.

Polymeric layers 702 and 703 may include a fire retardant such as magnesium hydroxide, calcium carbonate, talc, zinc borate, or another fire suitable retardant. Preferably, the fire retardant is non-halogenated. In some embodiments, the fire retardant may comprise 20-40 weight percent of the polymeric layers.

Polymeric layers 702 and 703 may also include various stabilizers such as high and low molecular weight hindered amine light stabilizers, phosphate antioxidants, phenolic antioxidants, or other suitable stabilizers. In some embodiments, one of polymeric layers 702 or 703 may be designated as a top layer of membrane 700, and may include more stabilizer than the bottom layer. For example, top layer 702 may include 1-5 weight percent of a stabilizer or stabilizers, while bottom layer 703 may include 1-2 percent of a stabilizer or stabilizers. The formulations of top and bottom layers 702 and 703 need not be identical. For example, top and bottom layers 702 and 703 may use different fire retardants or different stabilizers, or may differ in other respects. In other embodiments, the formulations of top and bottom layers 702 and 703 may be the same.

For the purposes of this disclosure, the words "top" and "bottom" refer to the orientations of the various materials in the figures. While these orientations correspond to orientation of the materials as they would be installed on a rooftop, it is to be recognized that the materials may be installed in other orientations, for example on a vertical wall, and that the claims are intended to encompass these other orientations.

Figure 8:
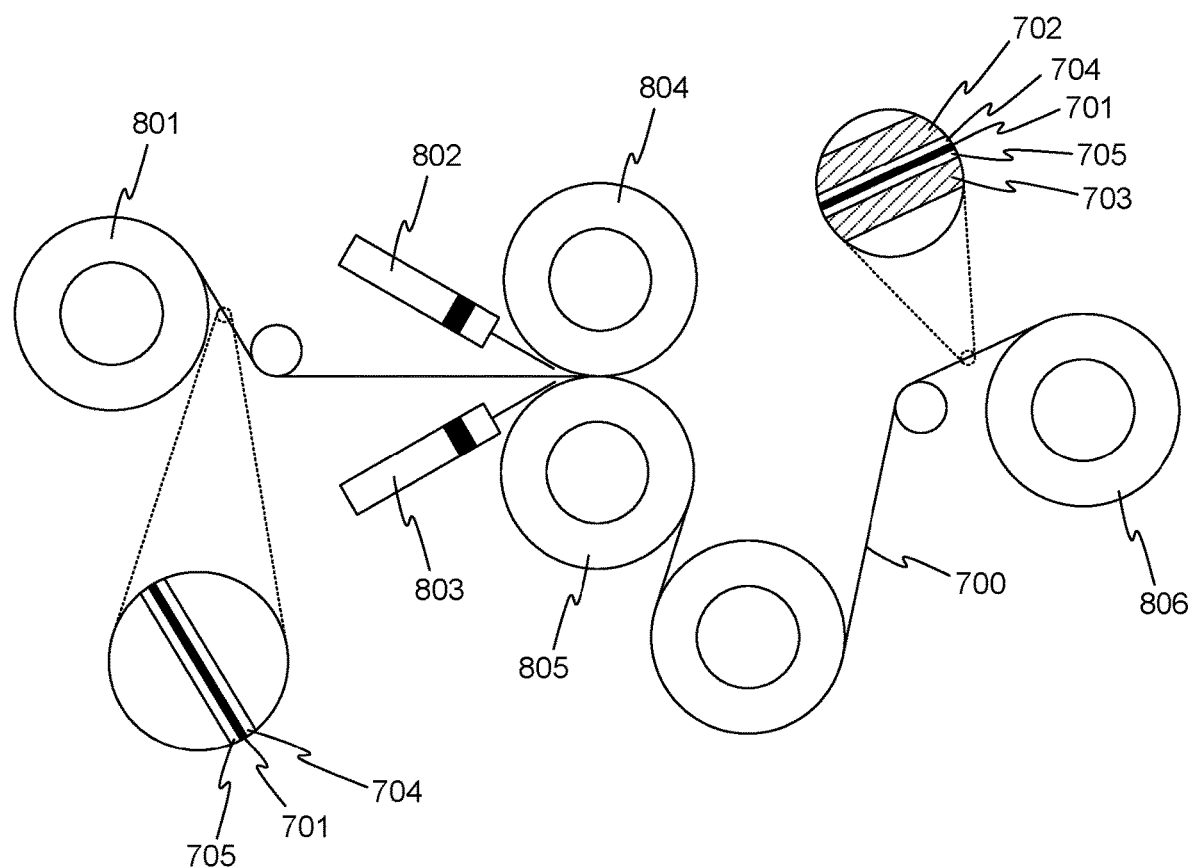
FIG. 8 illustrates a process of making a PIM barrier membrane, in accordance with embodiments of the invention.

FIG. 8 illustrates a process of making a PIM barrier membrane such as membrane 700, in accordance with embodiments of the invention. Metal layer 701 and its support film or films 704 and 705 are paid off of a supply roll 801, and passed between calendering rollers 804 and 805. Extruders 802 and 803 inject the material of polymeric layers 702 and 703. The completed membrane 700 is wound into a roll 806 for storage and shipment to a job site.

The process shown in FIG. 8 is known as co-extrusion, because both layers 702 and 703 are formed at the same or nearly the same time. In other embodiments, only one of layers 702 or 703 may be formed in a first pass. The half-completed membrane may then be sent through a second extrusion pass to form the other polymeric layer.

The extruder of FIG. 8 may have a length to diameter ration of 40:1, 50:1, 60:1, or another usable ratio. The components of polymeric layers 702 and 703 may be fed into extruders 802 and 803 in neat or pre-pelletized form. Each extruder may include an extruder screw and transfer zones that are optimized to mix the formulation components. From the extruder, the formulation can go through a melt pump which prevents pressure fluctuation of the melt going into the die. The die lip is used to control the amount of formulation being applied to the metallic film.

Calendering rollers 804 and 805 form a calendering stack, and may be stainless or treated galvanized rollers. More than two rollers may be used, for example four rollers. The thickness of membrane 700 is controlled by the die lip and the gap or opening of the calendering rollers. The gap or pressure generated from the calendering rollers helps control adhesion of the polymeric layers to the metallic film.

Completed membrane 700 may be considered a "single ply" membrane, even though it comprises various layers. In the field of roofing, the term "single ply" distinguishes a roofing membrane such as membrane 700 from a "built up roof", in which multiple components such as asphalt and ballast are separately applied to the roof. Membrane 700 may be supplied in any workable size, for example in rolls up to 50 feet wide or more and 100 feet long or more. In some embodiments, membrane 700 may be provided in rolls about 6 feet wide.

Metal layer 701 provides the desired RF attenuation in the 500 MHz to 6000 MHz frequency range. Plastic film layers 704 and 705 on both sides of the metal layer 701 provide electrical insulation to prevent unwanted metal-to-metal contact when the membrane contacts other metal surfaces or is folded back on itself. Because the metal layer is very thin, burrs do not form when the membrane is cut with a razor blade.

Figure 9:
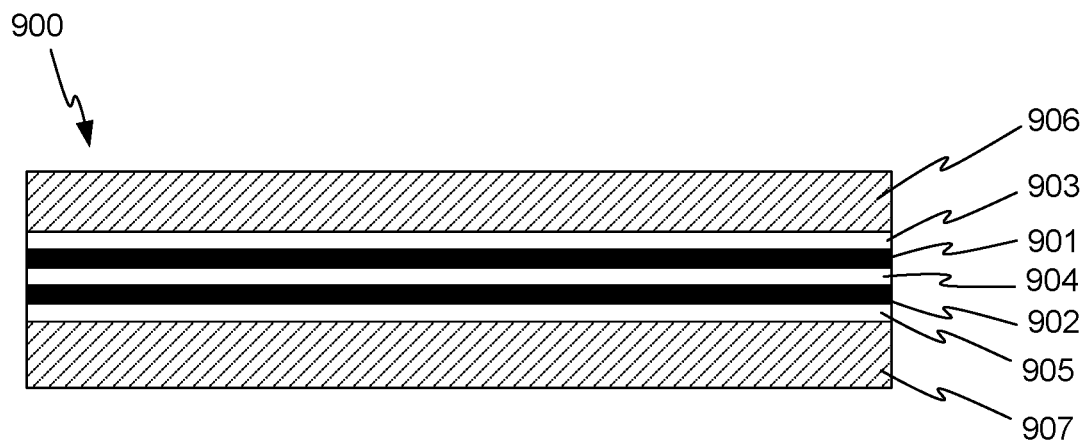
FIG. 9 illustrates a PIM barrier membrane in accordance with other embodiments of the invention.

In some embodiments, for example when higher RF attenuation is required, a second layer of aluminum or other metal can be added to the stack. For example, FIG. 9 illustrates a PIM barrier membrane 900 in accordance with other embodiments of the invention. In membrane 900, two metal layers 901 and 902 are interleaved with three plastic film support layers 903, 904, and 905. Layers 901-905 are then encapsulated between polymeric layers 906 and 907, for example in an extrusion process similar to that described above. Metal layers 901 and 902 may be similar to metal layer 701 described above. For example, metal layers 901 and 902 may be made of aluminum, copper, or another suitable metal, and may be 10 to 100 nanometers thick, or another suitable thickness. Plastic film layers 903-905 may be similar to film layers 704 and 705 described above, and polymeric layers 906 and 907 may be similar to layers 702 and 703 described above. Intermediate plastic film layer 904 prevents the two metal layers 901 and 902 from touching each other, so that the two metal layers do not become a PIM source.

In other embodiments, additional shielding may be provided using a single, thicker layer of metal.

A PIM barrier membrane such as membrane 700 or membrane 900 may be attached to a roof in any suitable way. In some embodiments, the edges of the PIM barrier membrane are heat welded to the existing roof membrane. In other embodiments, the PIM barrier membrane may be adhered to the existing roof using an adhesive or using a tape at the edges of the membrane. A PIM barrier membrane in accordance with embodiments of the invention may also be used in re-roofing applications and in new construction.

The polymeric layers of a membrane embodying the invention may be of any available color. For example, top layer 702 or 906 may be colored to match an existing roof, either by coloring the material of which the layer is made to match the existing roof, or by adding a coloring layer to the top of the membrane. In other embodiments, the color may be selected for different reasons. For example, top layer 702 or 906 may be made white or otherwise highly reflective to reduce the absorption of heat into the building.

While a membrane such as membrane 700 or membrane 900 is effective in mitigating PIM, other forms of RF barrier may be useful as well, alone or in conjunction with a barrier such as membrane 700 or membrane 900. For example, a self-adhesive barrier may be helpful for vertical or irregularly shaped surfaces.

Figure 10:
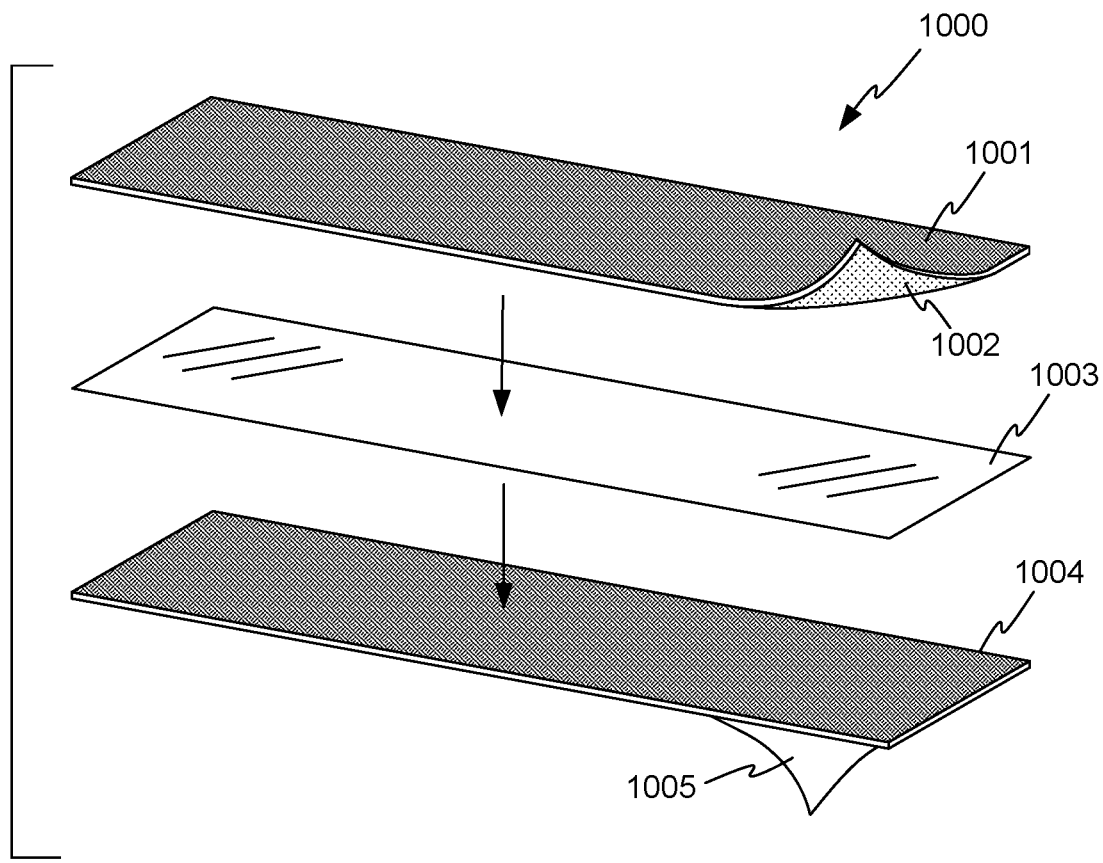
FIG. 10 illustrates an exploded view of a self-adhesive RF barrier tape in accordance with embodiments of the invention.

FIG. 10 illustrates an exploded view of a self-adhesive RF barrier tape 1000 in accordance with embodiments of the invention. Self-adhesive RF barrier tape 1000 includes a polymeric top layer 1001, made of a waterproof, durable material suitable for exposure to the elements on a rooftop. For example, polymeric top layer 1001 may be made of TPO thermoplastic polyolefin (TPO), ethylene propylene diene monomer (EPDM), polyvinyl chloride (PVC), or another suitable material. Polymeric top layer 1001 may have a thickness of 0.030-0.060 inches, or another suitable thickness. The top surface of polymeric top layer 1001 may be of any suitable color, for example black, white, gray, or another color. The top surface may be the natural color of the material of polymeric top layer 1001, or may be painted or otherwise coated to impart a different color. A highly reflective color such as white may be preferable in cool roof applications.

The underside 1002 of polymeric top layer 1001 is coated before assembly with an adhesive, for example an acrylic adhesive.

Self-adhesive RF barrier tape 1000 further includes a metal layer 1003. Metal layer 1003 may include, for example, a layer of aluminum 10 to 100 nanometers thick, vapor deposited on a plastic film (not separately shown). Other metals and thicknesses may be used. For example, in other embodiments the thickness of metal layer 1003 maybe up to 40 microns or more. In some embodiments, metal layer 1003 may be about 18 microns thick. The plastic film may be made of polyethylene, polyester, polypropylene, or another suitable material, and may have a thickness of 0.0005 to 0.025 inches, or another suitable thickness. In some embodiments, metal layer 701 may be a metal foil, which in turn may be bonded to a reinforcement mat made of polyester, glass, or another suitable material.

Self-adhesive RF barrier tape 1000 further includes an adhesive layer 1004. Adhesive layer 1004 may be made of an adhesive composition that can adhere to at least some common roofing materials. Examples of common roofing materials may include TPO, EPDM, PVC, modified bitumen, metals, brick, fiberglass, and wood. Adhesive layer 1004 may include a pressure sensitive adhesive. In some embodiments, adhesive layer 1004 is made of bitumen (asphalt) or modified bitumen and has a thickness of between 0.030 and 0.060 inches. Other adhesives and thicknesses may be used as well.

A release liner 1005 is preferably temporarily attached to the bottom surface of adhesive layer 1004. Release liner 1005 may be a thin plastic, a silicone-coated paper, or another material that lightly adheres to the adhesive of adhesive layer 1004, but can be easily removed without damaging adhesive layer 1004. Self-adhesive RF barrier tape 1000 may be shipped to a job site with release liner 1005 in place, and release liner 1005 is then removed just prior to installation of tape 1000.

Figure 11:
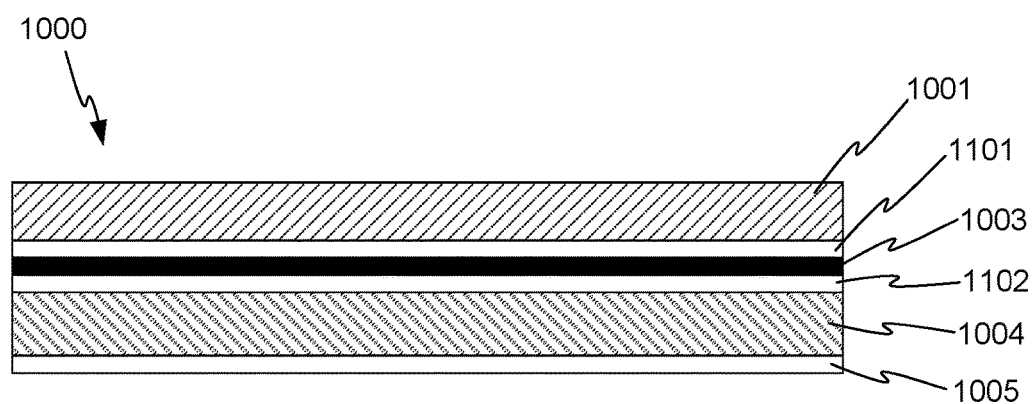
FIG. 11 shows an edge view of the self-adhesive RF barrier tape of FIG. 10, in its assembled state.

FIG. 11 shows an edge view of self-adhesive RF barrier tape 1000, in its assembled state. In order from the top, self-adhesive RF barrier tape 1000 includes polymeric top layer 1001, and a layer of adhesive 1101 on the underside of polymeric top layer 1001. Metal layer 1003 is adhered to adhesive 1101, and is supported by plastic film layer 1102. Adhesive layer 1004 is adhered to plastic film layer 1102, and is covered on its bottom side by release liner 1005. In other embodiments, the positioning of metal layer 1003 and plastic film layer 1102 may be reversed.

Self-adhesive RF barrier tape 1000 may be manufactured in any workable size, for example in rolls 60 inches wide or more. Narrower tapes may be made, or may be cut from wider tapes. For example, widths of 6, 12, 18, or 24 inches may be produced, or other widths.

Prior to attaching self-adhesive RF barrier tape 1000 to a rooftop surface, the roof surface should be clean, dry and free of oils or grease. Dusty surfaces may be primed with a water or solvent based primer prior to applying the RF barrier to improve adhesion. Self-adhesive RF barrier tape 1000 should be un-rolled and the pressure sensitive adhesive side pressed against the surface to be covered. A roller can be used to help press the adhesive into the roof surface to help maximize adhesion.

Referring again to FIG. 3, PIM sources such as sources 306 may not be apparent from a visual inspection of roof 201, because they may be buried within roof 201. The presence of PIM at a particular cell site may be suggested by a statistical analysis of the performance of the cell site. For example, a cell site with significant PIM may have a shorter average call duration or a higher percentage of dropped calls than another similarly-situated site. If the differences in performance are not explained by other factors, PIM may be suspected.

It is desirable to have a method of finding and mitigating PIM sources, in accordance with embodiments of the invention. Such a method may be practiced when PIM is specifically suspected, or as a matter of general practice for network optimization.

Figure 12:
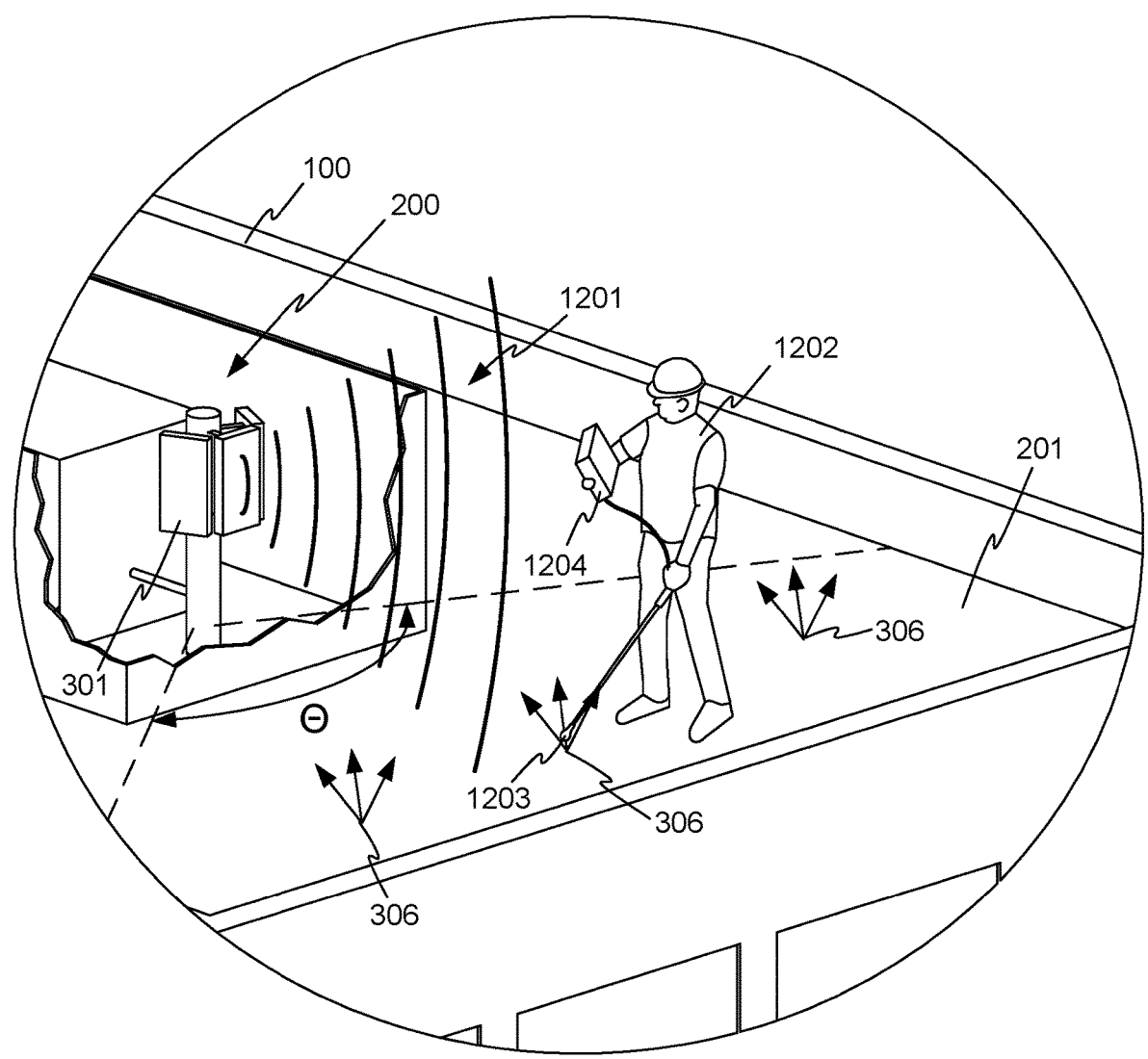
FIG. 12 illustrates a technique for locating PIM sources, in accordance with embodiments of the invention.

FIG. 12 illustrates a technique for locating PIM sources, in accordance with embodiments of the invention, in the context of building 100 and cell site 200. Two signals of known frequency are injected into antenna 301, which produces radio frequency (RF) radiation 1201 containing the two known frequencies toward part of roof 201. The RF radiation excites passive intermodulation (PIM) sources 306, which re-radiate broad spectrum RF radiation.

An intermodulation frequency is calculated from the known frequencies of the two injected signals. Preferably, this is the third-order intermodulation frequency IM3, but other frequencies could be used.

A worker 1202 "walks" the roof area of interest, carrying a probe 1203 sensitive to the RF radiation produced by PIM sources 306. Probe 1203 is passed over the roof and receives intermodulation frequencies generated by PIM sources generated at locations on the roof. Probe 1203 may be, for example, a PIMHunter™ probe manufactured by Anritsu Corporation of Kanagawa, Japan, or another suitable kind of probe.

The signal received by probe 1203 is fed to a spectrum analyzer 1204. A spectrum analyzer is an instrument that can separate an electronic signal into its frequency components, and measure the amplitude of the signal as a function of frequency. Spectrum analyzer 1204 may be, for example, a model MS2720T Spectrum Master™ spectrum analyzer manufactured by Anritsu Corporation, or another suitable kind of spectrum analyzer.

Worker 1202 sweeps the area of interest while monitoring the output of spectrum analyzer 1204. Preferably, at least the area of roof 201 within the half power beamwidth θ of antenna 301 is swept. Worker 1202 monitors the output of spectrum analyzer 1204 to see if the amplitude of any sensed signal at the intermodulation frequency exceeds a predetermined threshold. For example, worker 1202 may monitor a graphical display of spectrum analyzer 1204. Depending on the model of spectrum analyzer used, spectrum analyzer 1204 may be able to generate an audible signal when the threshold is exceeded at the frequency of interest.

When the threshold amplitude is exceeded, it may be suspected that a PIM source has been detected. The roof location may be marked for mitigation.

Figure 13:
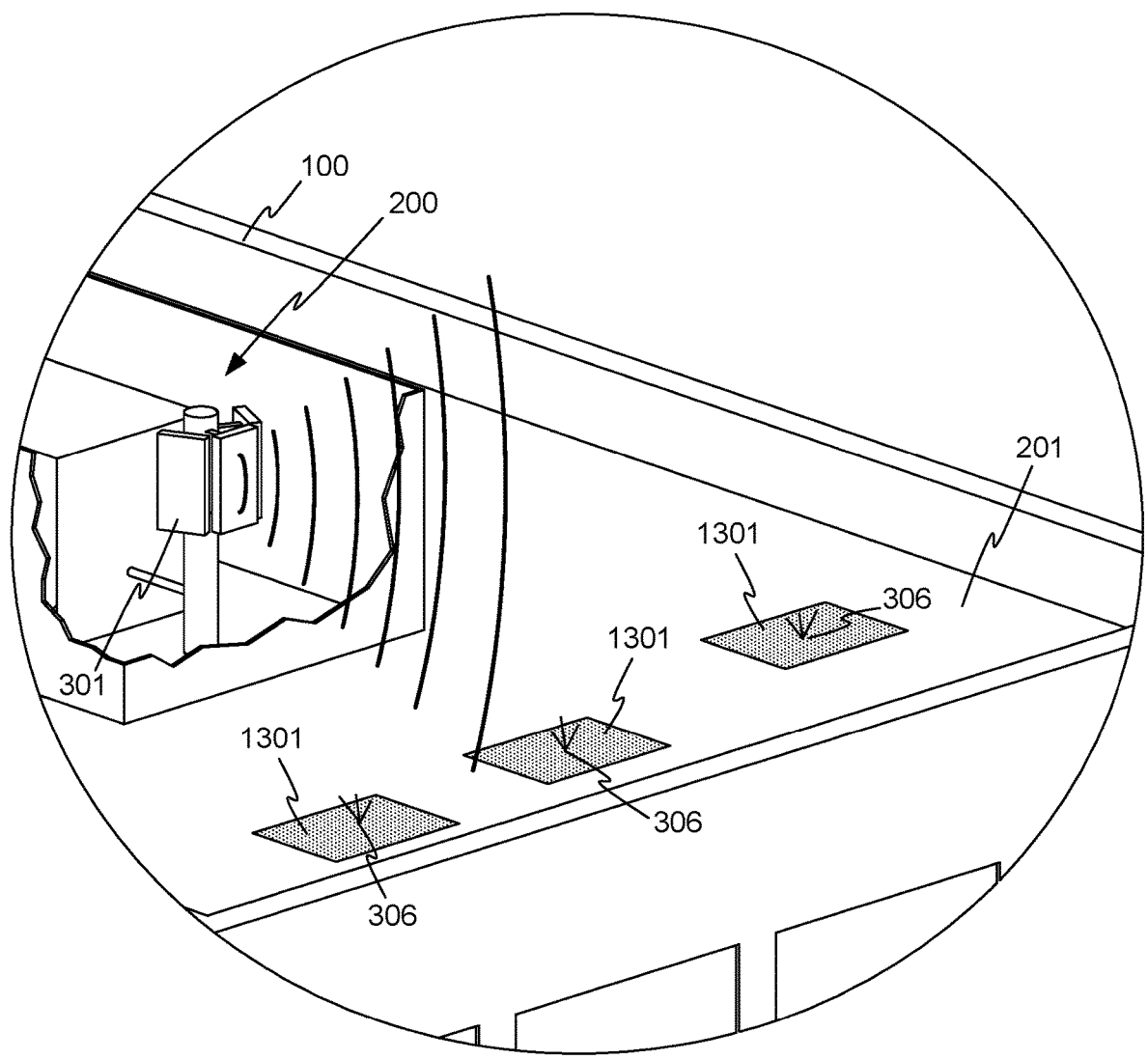
FIG. 13 shows suspected PIM sources covered with respective pieces of barrier material, in accordance with embodiments of the invention.

Once potential PIM sources such as sources 306 have been located, each potential source can be covered with a radio frequency barrier material configured to mitigate passive intermodulation. FIG. 13 shows suspected PIM sources 306 covered with respective pieces of barrier material 1301, in accordance with embodiments of the invention. Barrier material 1301 may be temporary and put in place for additional testing and verification, or may be a permanent application.

Suitable barrier materials may include absorptive materials such as RF absorbing foams, or reflective materials such as metal foil encapsulated between nonconductive insulation, for example polymeric layers as described above.

Roof 201 may be re-measured with barrier materials 1301 in place to test whether the PIM has been satisfactorily mitigated. Re-measurement may verify a reduction in PIM caused by PIM sources 306, or may reveal that additional mitigation measures are needed. For example, the re-measurement may detect additional PIM sources that were not previously detected, as PIM is a dynamic phenomenon and may be affected by foot traffic on roof 201, nearby metal objects, wind, or other factors. Any additional PIM sources may be mitigated similarly to PIM sources 306. Any mitigated PIM sources that still radiate significantly at the intermodulation frequency may have additional layers of barrier material 1301 applied. Any number of test-and-mitigate iterations may be performed.

If barrier materials 1301 are temporary, they are preferably removed and replaced with more permanent materials, for example barrier membranes having a metal layer encapsulated between polymeric layers, as described above. The barrier material may be self-adhesive, may be adhered to the existing roof with an added adhesive or by heat welding, or may be affixed to the roof in another suitable way. Preferably, the existing roof is not damaged. For example, the barrier material is preferably not attached using penetrating fasteners.

Figure 14:
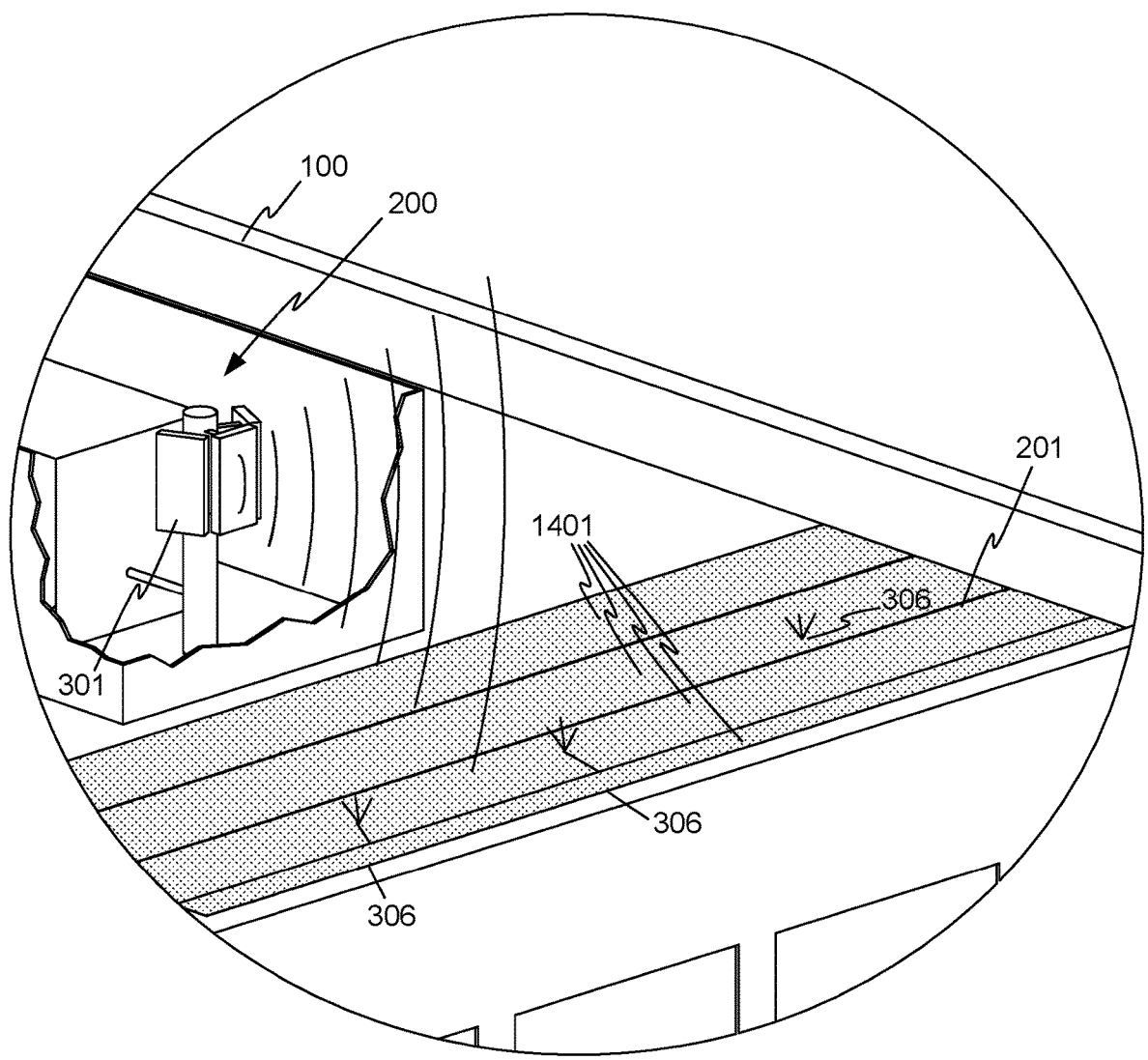
FIG. 14 illustrates large pieces of barrier material applied to the entire area of interest on a roof, in accordance with embodiments of the invention.

The relatively small pieces of barrier material 1301 shown in FIG. 13 may be called "walkpads." In other embodiments, larger areas of roof 201, possibly including multiple PIM sources, may be covered with PIM barrier material, rather than covering the PIM sources individually. FIG. 14 illustrates larger pieces of barrier material 1401 applied to the entire area of interest on roof 201. Barrier material 1401 is preferably supplied in a roll, so that installation of larger areas may be simplified.

Figure 15:
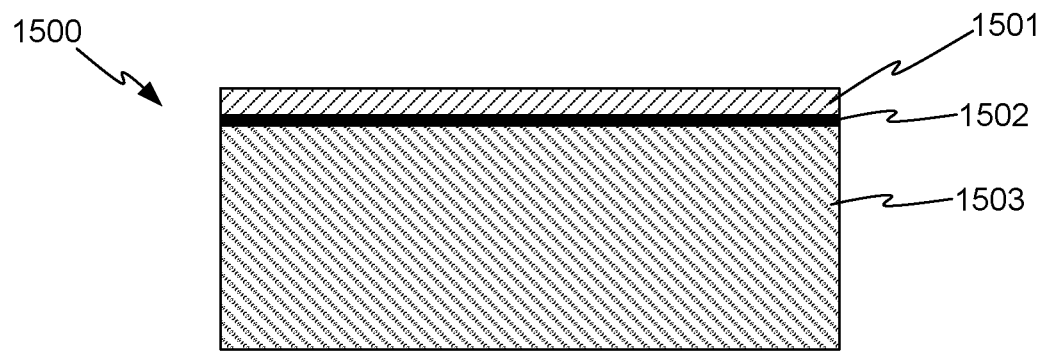
FIG. 15 illustrates a mat RF barrier, in accordance with embodiments of the invention.

In applications where PIM mitigation would be desirable but the building owner does not want the RF barrier permanently attached to the roof surface, a "mat" RF barrier 1500 can be deployed as shown in FIG. 15. The mat may be constructed using the same rugged outer layer 1501 and insulated metal layer 1502 as self-adhesive RF barrier tape 1000 described above, or similar materials suitable for exposure to the elements on a roof. However, the bottom layer 1503 in this form is a thick rubber mat such as is commonly used for lining gym floors or horse stalls. Additional layers such as adhesive layers, film backing for metal layer 1502, or other layers may be present. The mat material 1503 may have a thickness of 0.5 to 0.75 inches, or another suitable thickness. The weight of the rubber mat provides ballast to hold the RF barrier in place. Additional ballast in the form of concrete blocks can be applied to the top of the mat if desired or necessary, for example in areas with higher wind requirements.

Figure 16:
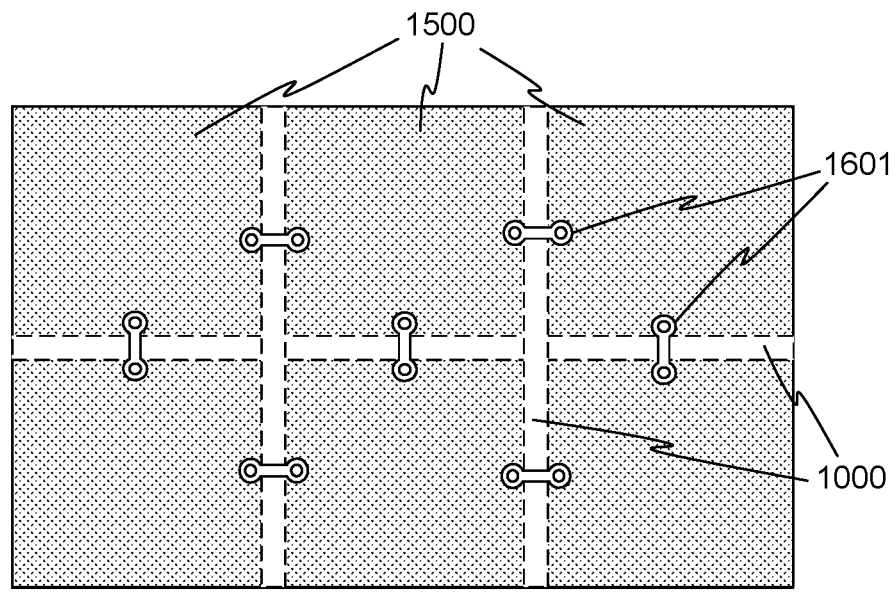
FIG. 16 illustrates the installation of the mat RF barrier of FIG. 15, in accordance with embodiments of the invention.

Such mat type RF barriers may be supplied in square sections measuring 36 inches by 36 inches, or in another suitable shape and size. Larger sections are possible to manufacture but are not practical for transporting onto rooftops due to their size and weight. To cover large surface areas, multiple mats can be deployed and mechanically joined together as shown in FIG. 16. To prevent RF energy from passing through the gap between matts and exciting PIM sources below, self-adhesive RF barrier material 1000 can be applied over the seams. While this tape does not create a continuous electrical connection between the individual barriers, it does provide sufficient capacitive coupling between barriers provide a continuous RF barrier. Additional mat connector mechanisms 1601 may be provided if desired.

Figure 17:
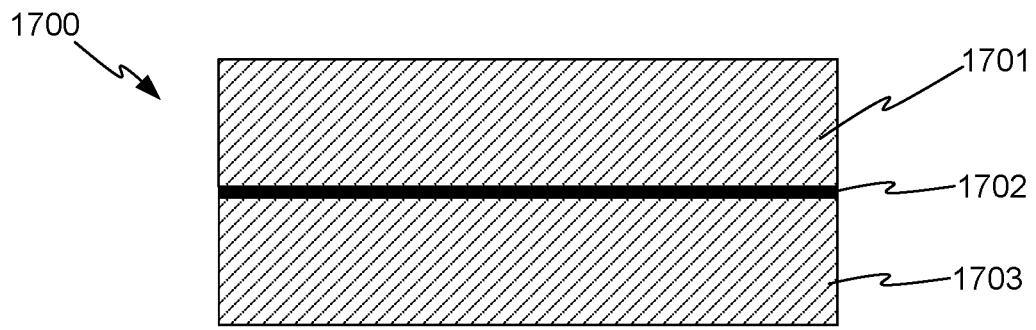
FIG. 17 illustrates a mat RF barrier in accordance with other embodiments of the invention.

An alternate method for producing the mat style RF barrier material 1700 is shown in FIG. 17. In this configuration, the outer rugged layer 1701 is replaced with a 0.25 inch to 0.38 inch rubber mat layer and the lower mat layer 1703 is reduced in thickness to 0.25 inch to 0.38 inch, yielding the same over-all mat thickness. Metal layer 1702 is encapsulated between mat layers 1701 and 1703. Other layers may be present as well.

Figure 18:
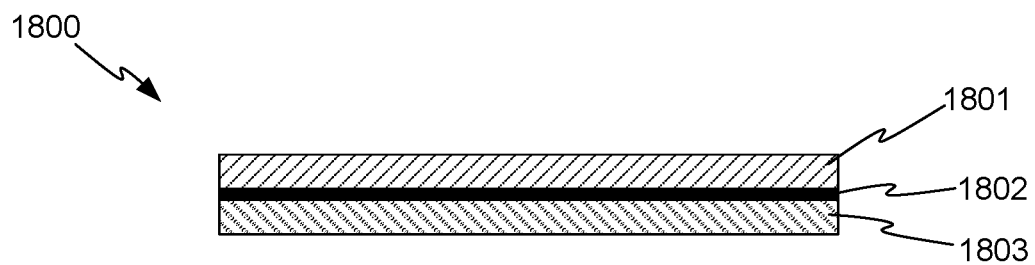
FIG. 18 illustrates an RF barrier membrane in accordance with other embodiments of the invention.
Figure 19:
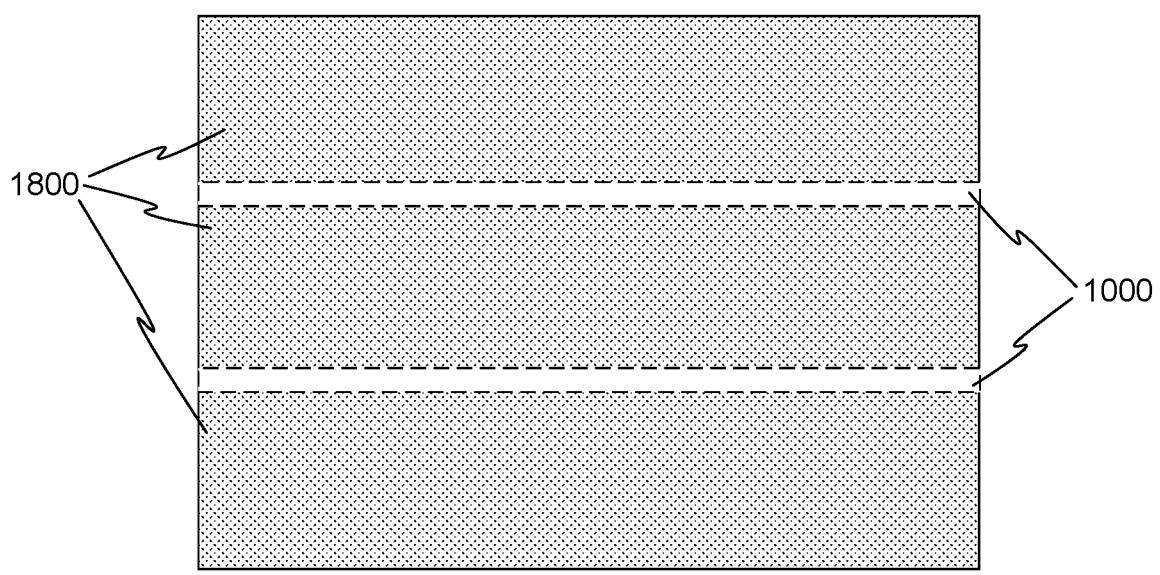
FIG. 19 illustrates the installation of the RF barrier membrane of FIG. 18, in accordance with embodiments of the invention.

In some cases, it may be desirable to replace an existing roof membrane with an RF barrier membrane rather than apply separate RF barriers on top of the existing membrane. This might be the case when an RF barrier needs to be applied to reduce PIM, but the existing roofing system is close to the end of its useful life. For this application, an RF barrier 1800 as shown in FIG. 18 may be used. RF barrier 1800 comprises an outer rugged layer 1801 with inner insulated metal layer 1802 as previously described with a second outer rugged layer 1803. The thicknesses of the outer rugged layers may be reduced to 0.015 inch to 0.030 inch per layer to maintain the overall membrane thickness. Outer layers 1801 and 1803 may be made of, for example, EPDM, TPO, or PVC. Installation of this membrane may utilize the existing installation processes and bonding materials. The self-adhesive tape RF barrier material 1000 as shown in FIG. 10 can be used at the seams to achieve a continuous RF barrier, as shown in FIG. 19.

The invention has now been described in detail for the purposes of clarity and understanding. However, those skilled in the art will appreciate that certain changes and modifications may be practiced within the scope of the appended claims.

What is claimed is:

1. A roofing membrane for reducing passive intermodulation, comprising:
   a first polymeric layer;
   a second polymeric layer; and
   a metal layer encapsulated between the first and second polymeric layers, wherein:
   the first polymeric layer and the second polymeric layer each comprise one or more materials selected from a group of materials consisting of thermoplastic polyolefin (TPO), ethylene propylene diene monomer (EPDM), and polyvinyl chloride (PVC).

2. The roofing membrane for reducing passive intermodulation of claim 1, wherein:
   the metal layer is perforated with a plurality of holes.

3. The roofing membrane for reducing passive intermodulation of claim 2, wherein:
   each of the plurality of holes has a size of no more than $\frac{1}{50}^{th}$ of a wavelength of a lowest operating frequency of a cell site positioned atop the roofing membrane.

4. The roofing membrane for reducing passive intermodulation of claim 1, wherein:
   the metal layer comprises a metal foil that is bonded to a reinforcement mat.

5. The roofing membrane for reducing passive intermodulation of claim 4, wherein:
   the reinforcement mat comprises one or both of polyester and glass.

6. The roofing membrane for reducing passive intermodulation of claim 1, further comprising:
   an additional metal layer; and
   a third polymeric layer, wherein the additional metal layer is encapsulated between the second polymeric layer and the third polymeric layer.

7. The roofing membrane for reducing passive intermodulation of claim 1, wherein:
   a thickness of the metal layer is less than about 40 microns.

8. A method of manufacturing a roofing membrane for reducing passive intermodulation, comprising:
   extruding a first polymeric material onto a first surface of a metal layer;
   extruding a second polymeric material onto a second surface of the metal layer, the first surface being opposite the second surface, wherein the first polymeric material and the second polymeric material each comprise one or more materials selected from a group of materials consisting of thermoplastic polyolefin (TPO), ethylene propylene diene monomer (EPDM), and polyvinyl chloride (PVC); and
   passing the first polymeric material, metal layer, and second polymeric layer through a calendaring stack to form a roofing membrane.

9. The method of manufacturing a roofing membrane for reducing passive intermodulation of claim 8, further comprising:
   forming the metal layer by coating a polymeric film with a metal material.

10. The method of manufacturing a roofing membrane for reducing passive intermodulation of claim 9, wherein:
    forming the metal layer by coating the polymeric film with the metal material comprises vapor depositing the metal material onto the polymeric film.

11. The method of manufacturing a roofing membrane for reducing passive intermodulation of claim 8, wherein:
    the first polymeric material and the second polymeric material are extruded simultaneously.

12. The method of manufacturing a roofing membrane for reducing passive intermodulation of claim 8, wherein:
    the metal layer comprises a first metal layer; and
    the first metal layer is coupled with a second metal layer with a first plastic film layer interposed between the first metal layer and the second metal layer.

13. The method of manufacturing a roofing membrane for reducing passive intermodulation of claim 12, wherein:
    the first metal layer comprises a second plastic film layer positioned on an opposite surface of the first metal layer as the first plastic film layer;
    the second metal layer comprises a third plastic film layer positioned on an opposite surface of the second metal layer as the first plastic film layer;
    the first polymeric material is extruded onto the first plastic film layer; and
    the second polymeric material is extruded onto the second plastic film layer.

14. The method of manufacturing a roofing membrane for reducing passive intermodulation of claim 8, further comprising:
    winding the roofing membrane into a roll.

15. A self-adhesive RF barrier tape, comprising:
    a polymeric top layer comprising one or more materials selected from a group of materials consisting of thermoplastic polyolefin (TPO), ethylene propylene diene monomer (EPDM), and polyvinyl chloride (PVC);
    a metal layer coupled with a bottom surface of the polymeric top layer; and
    an adhesive layer positioned on a side of the metal layer opposite the polymeric top layer.

16. The self-adhesive RF barrier tape of claim 15, wherein:
    the polymeric top layer has a thickness of between about 0.030 and 0.060 inches.

17. The self-adhesive RF barrier tape of claim 15, further comprising:
    a release liner attached to a bottom surface of the adhesive layer.

18. The self-adhesive RF barrier tape of claim 15, wherein:

the adhesive layer comprises one or both of bitumen and modified bitumen.

19. The self-adhesive RF barrier tape of claim 15, wherein:
the metal layer comprises a polymeric film layer or a reinforcement mat.

20. The self-adhesive RF barrier tape of claim 15, further comprising:
an additional adhesive layer disposed between polymeric top layer and the metal layer.

* * * * *